(12) United States Patent
Pedersen (10) Patent No.: US 9,703,989 B1
(45) Date of Patent: Jul. 11, 2017

(54) SECURE PHYSICALLY UNCLONABLE FUNCTION (PUF) ERROR CORRECTION

(71) Applicant: Altera Corporation, San Jose, CA (US)

(72) Inventor: Bruce Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/581,354

(22) Filed: Dec. 23, 2014

(51) Int. Cl.
  *G06F 12/14* (2006.01)
  *G06F 11/30* (2006.01)
  *G06F 21/75* (2013.01)

(52) U.S. Cl.
  CPC .................................. *G06F 21/75* (2013.01)

(58) Field of Classification Search
  CPC ....................................................... G06F 21/75
  USPC ......................................................... 713/189
  See application file for complete search history.

(56) References Cited

U.S. PATENT DOCUMENTS

| | | | |
|---|---|---|---|
| 8,159,260 B1 | 4/2012 | Behrends et al. | |
| 8,719,666 B2 | 5/2014 | Marinet | |
| 2006/0210082 A1* | 9/2006 | Devadas | G06F 21/31 380/277 |
| 2009/0169015 A1* | 7/2009 | Watanabe | H04L 9/0858 380/278 |
| 2010/0293384 A1* | 11/2010 | Potkonjak | H04L 9/3247 713/176 |
| 2011/0033041 A1* | 2/2011 | Yu | G06F 11/10 380/28 |
| 2012/0093308 A1* | 4/2012 | Choi | H03K 19/20 380/28 |
| 2013/0019324 A1* | 1/2013 | Tehranipoor | H03K 3/0315 726/34 |
| 2014/0042627 A1* | 2/2014 | Edelstein | H04L 9/3278 257/758 |
| 2014/0111234 A1 | 4/2014 | Laackmann et al. | |
| 2014/0325241 A1* | 10/2014 | Shimizu | G06F 21/75 713/192 |
| 2015/0082405 A1* | 3/2015 | Sakemi | H04L 63/08 726/7 |

OTHER PUBLICATIONS

Markus Dichtl; High-Speed True Random No. Generation with Logic Gates Only; iacr.org; Year: 2007.*

* cited by examiner

*Primary Examiner* — Monjour Rahim
(74) *Attorney, Agent, or Firm* — Treyz Law Group, P.C.; Jason Tsai (57) ABSTRACT

An integrated circuit having a Physically Unclonable Function (PUF) circuit is provided. The PUF circuit may be part of a secure subsystem, which also includes a random number generator, a syndrome generator, non-volatile memory, and control circuitry. A predetermined syndrome of a desired PUF response is stored in the non-volatile memory. During normal operation, a current PUF response may be read out from the PUF circuit. The current PUF response may differ from the desired PUF response. The random number generator may generate a random number that masks the current PUF response, whereas the syndrome generator outputs a syndrome of the current PUF response. This information may then be passed to an error-correcting code (ECC) processor. The ECC processor may return information to the secure subsystem. The control circuitry may then obtain a corrected PUF response that matches the desired PUF response.

13 Claims, 8 Drawing Sheets

SECURE PHYSICALLY UNCLONABLE FUNCTION (PUF) ERROR CORRECTION

BACKGROUND

This relates to integrated circuits and in particular, to integrated circuits that perform error correction.

Integrated circuit devices are often used to transmit, read, and store information that is susceptive to corruption. In particular, when bits of data are stored or read from memory, processed using digital or analog circuitry, or transmitted from one device to another, some of these data bits can be inadvertently flipped due to electronic noise, physical variations on the die, or radiation. To address this problem, error-correcting codes (ECC) are often employed by adding extra bits to the data to be corrected. The extra bits (sometimes referred to as the "syndrome") can be used to help detect and correct for errors in the data.

Examples of such error-correcting codes include Low-Density Parity Codes (LDPC), Bose-Chaudhuri-Hocquenghem (BCH) Codes, and Turbo Codes. The implementation of such codes to protect against multiple random bit errors is rather complex and typically requires use of a separate processor such as a generic CPU or a microcontroller. In some cases, however, the data to be corrected contains secret information that must be protected, and passing the data to a generic processor or microcontroller may allow that secret information to be accessed by an unauthorized party.

One application that requires both error correction and secrecy is the implementation of a Physically Unclonable Function (PUF) circuit. A PUF circuit has behavior that is determined by random physical variations such as within the integrated circuit or within the environment of the integrated circuit. The variations may depend on operating temperature, operating voltage, stress-related changes in transistor characteristics such as due to negative bias threshold instability (NBTI), accumulated environmental radiation effects, thermal noise, or other sources of variations. Due to these variations, no two PUF circuits have the same output, and for this reason, PUF circuits are often used to help differentiate between integrated circuits that are otherwise identical.

One potential use of a PUF circuit is to generate or protect encryption keys. For example, the output of the PUF circuit might be directly used as an encryption key or may be used to mask an encryption key. However, since PUF circuits are based on random variations of the integrated circuits on which they are formed, the output of a PUF circuit may change if the variations change over time or if there is any noise present. Conventionally, the PUF circuit output may be fed to a generic processor or microcontroller that implements one of the ECC algorithms to correct for such changes. Correcting the PUF output in this way, however, exposes the PUF output (which is considered sensitive information) to potential attackers of the system.

SUMMARY

Circuitry that includes a secure subsystem and an associated error correction processor may be provided. The error correction processor may be a generic non-secure error-correcting code (ECC) processor or microcontroller. The secure subsystem may include a Physically Unclonable Function (PUF) circuit that generates a current PUF response, a random generator that generates a random number for masking the current PUF response (i.e., to generate a masked PUF response), non-volatile memory for storing a syndrome of a desired/target PUF response (where the current PUF response may be mismatched from the desired PUF response), and a syndrome generator for generating a syndrome of random data.

The syndrome of the random data may be used to mask the syndrome of the desired PUF response to obtain a masked syndrome. The secure subsystem may output the masked PUF response and the masked syndrome to the ECC processor. The ECC processor may perform error correction operations on the data received from the secure subsystem and may return a corrected masked PUF response back to the secure subsystem. The secure subsystem may also include control circuitry for obtaining a corrected PUF response based at least partly on the corrected masked PUF response, the current PUF response, the masked PUF response, and the random data.

In another suitable embodiment, the ECC processor may perform error correction operations on the data received from the secure subsystem and may return a combined value back to the secure subsystem. In this scenario, the control circuitry in the secure subsystem may obtain a corrected PUF response based only on the combined value and the current PUF response.

Further features of the invention, its nature and various advantages will be more apparent from the accompanying drawings and the following detailed description of the preferred embodiments.

DETAILED DESCRIPTION

The present invention relates to integrated circuits with Physically Unclonable Function (PUF) circuits. The integrated circuits may be programmable integrated circuits, dedicated integrated circuits, or integrated circuits including both programmable and dedicated circuitry. Programmable integrated circuits can be programmed by a user to implement a desired custom logic function. In a typical scenario, a logic designer uses computer-aided design (CAD) tools to design a custom logic circuit. When the design process is complete, the tools generate configuration data. The configuration data is loaded into programmable integrated circuit memory elements to configure the device to perform the functions of the custom logic circuit. In particular, the configuration data configures programmable interconnects, programmable routing circuits, and programmable logic circuits in the programmable integrated circuits. Dedicated integrated circuits may include application-specific integrated circuits, general purpose processor chips, application-specific processor chips, digital signal processor chips, or any desired dedicated integrated circuits.

Figure 1:
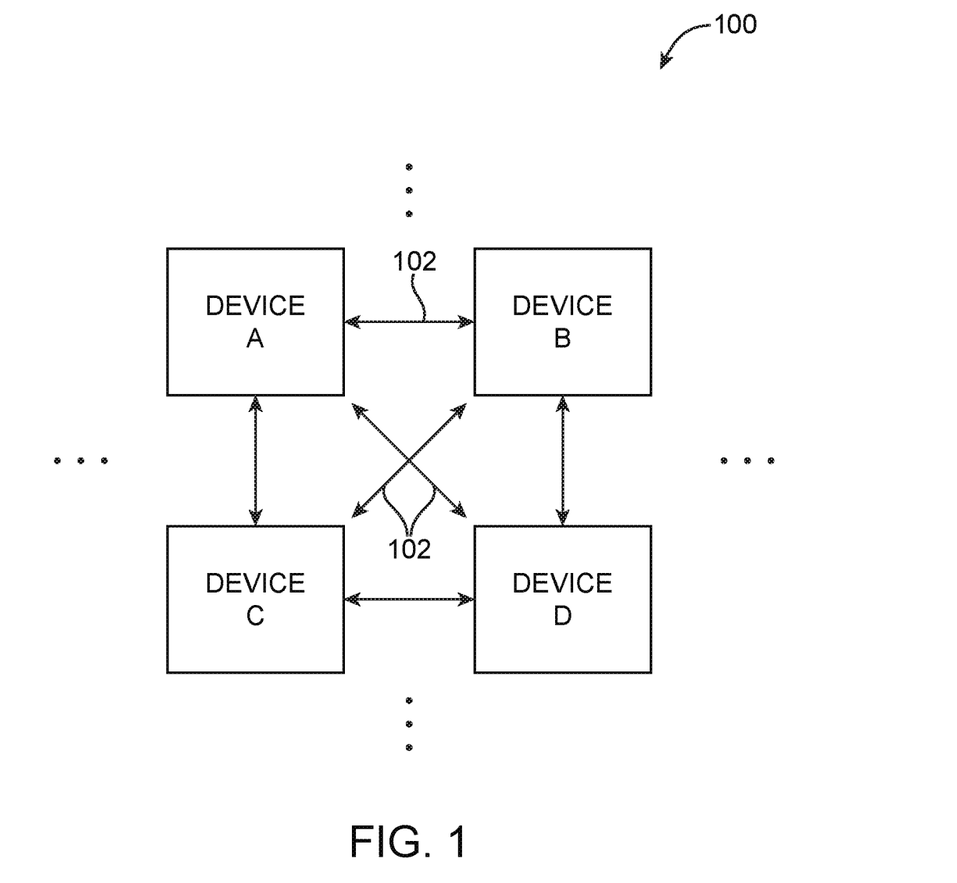
FIG. 1 is a diagram of an illustrative system of integrated circuit devices operable to communicate with one another in accordance with an embodiment.

An illustrative system 100 of interconnected electronic devices is shown in FIG. 1. The system of interconnected electronic devices may have multiple electronic devices such as device A, device B, device C, device D, and interconnection resources 102. Interconnection resources 102 such as conductive lines and busses, optical interconnect infrastructure, or wired and wireless networks with optional intermediate switching circuitry may be used to send signals from one electronic device to another electronic device or to broadcast information from one electronic device to multiple other electronic devices. For example, a transmitter in device B may transmit data signals to a receiver in device C. Similarly, device C may use a transmitter to transmit data to a receiver in device B.

The electronic devices may be any suitable type of electronic device that communicates with other electronic devices. Examples of such electronic devices include basic electronic components and circuits such as analog circuits, digital circuits, mixed-signal circuits, circuits formed within a single package, circuits housed within different packages, circuits that are interconnected on a printed-circuit board (PCB), etc.

Each of the devices in FIG. 1 may have its own PUF circuit. The PUF circuit in each individual device may rely on manufacturing variations or other sources of explicit variation that is particular to that integrated circuit die to implement a function that results in a random but repeatable output for a given input. In other words, different integrated circuit devices having different manufacturing variations or other variations would generate different PUF outputs given the same input.

One exemplary use of a PUF circuit is the creation or protection of encryption keys that are used for secure communications between the different devices in system 100. As examples, the output of a PUF circuit might be used directly as an encryption key or might be used to mask an encryption key that is stored in non-volatile memory within an integrated circuit. In the latter case in which the PUF output is used to mask an encryption key (e.g., a private user key), the value stored in the non-volatile memory may be equal to the result of taking a logic exclusive OR (XOR) on the private user key and the PUF output. In this case, the private user key can be derived by taking the XOR of the non-voltage value and the PUF output.

In such types of systems, the security can be increased if obtaining the PUF output value is more difficult than obtaining the non-volatile memory value. However, since PUF circuits are based on random variations, the output of the PUF circuit can still change over time for a given input if the variations change over time or if there is noise in the measurement of the source of the variations. Such unpredictable changes can be corrected by creating a syndrome for one PUF result and storing that syndrome in non-volatile memory. In this way, error correcting code (ECC) circuitry can then use the stored syndrome to correct some number of erroneous bits in subsequent PUF responses for the same input.

In accordance with an embodiment, it is generally desirable to provide a way of correcting erroneous bits in the subsequent PUF responses using a generic ECC processor (i.e., a potentially unsecure processor) without actually revealing the raw PUF output to the ECC processor.

Figure 2:
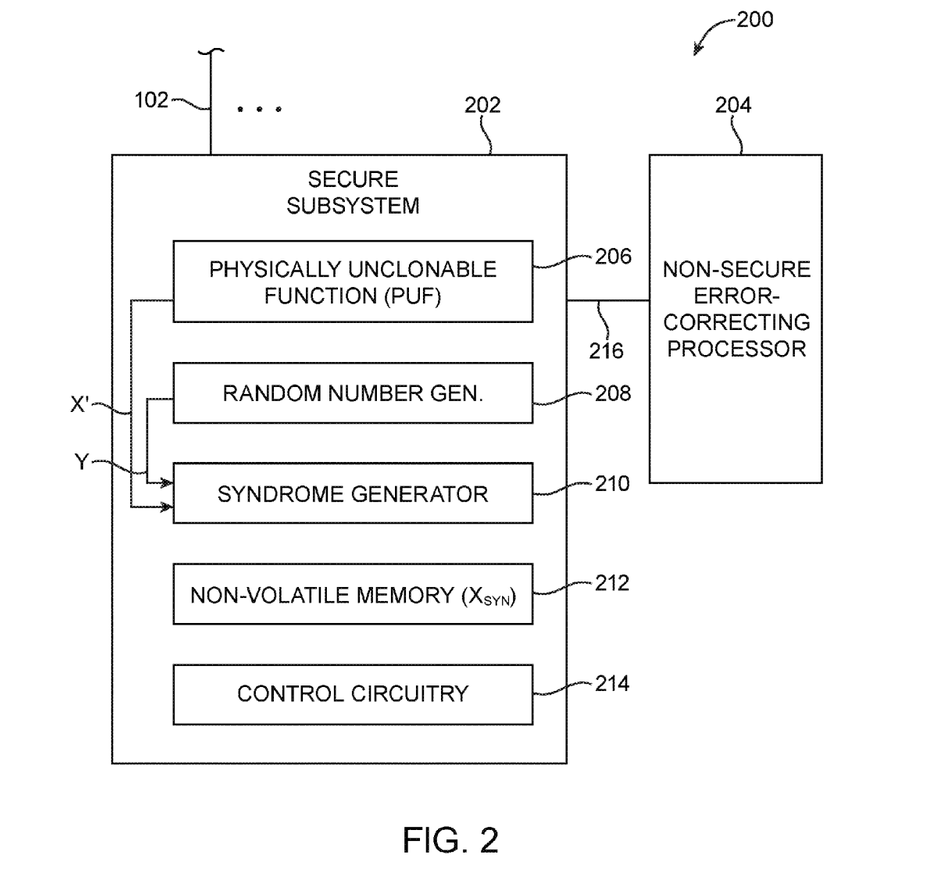
FIG. 2 is a diagram of an illustrative secure subsystem that includes a Physically Unclonable Function (PUF) circuit and that is coupled to a non-secure error correcting processor in accordance with an embodiment.

FIG. 2 shows a diagram of an integrated circuit system 200 that includes a secure subsystem 202 and a potentially non-secure error-correcting processor 204 (e.g., a generic processor or microcontroller). In one embodiment, secure subsystem 202 and non-secure error correcting processor 204 are formed on the same integrated circuit die. In another suitable embodiment, secure subsystem 202 and non-secure error-correcting processing 204 are formed on separate integrated circuit dies.

Secure subsystem 202 may receive data and/or control signals from path 102 and may communicate with non-secure error-correcting processor 204 via communications path 216. As shown in FIG. 2, secure subsystem 202 may include a Physically Unclonable Function (PUF) circuit such as PUF circuit 206, a random number generator 208, a syndrome generator 210, non-volatile memory 212, and associated control circuitry 214. In the example of FIG. 2, non-volatile memory 212 is shown to be part of secure subsystem 202, but in general, non-volatile memory 212 can also be formed as a separate component from secure subsystem 202.

Non-secure error-correcting processor 204 may be used to implement any linear error-correcting code. A linear error-correcting code is generally defined as a code that produces a syndrome $S(X)$ for data X such as for any two data values X and Y (each of which contains one or more bits of information), the syndrome of the sum of X and Y is equal to the sum of the syndrome of X and the syndrome of Y (i.e., $S(X+Y)=S(X)+S(Y)$). The term "sum" is a generalized finite field operation that is typically performed by a logical XOR operation. More generally, processor 204 may be used to implement any error-correcting code that produces syndrome $S(X)$, where $S(X)$ can be described as the matrix multiplication of M and X, and where M is a matrix and X is a data vector (assuming M and X both include finite field members). For example, if X is a vector of binary bits, the error correcting codes implemented by processor 204 may create a syndrome of binary bits each of which is the exclusive OR (XOR) of some subset of the bits in X.

In accordance with an embodiment, secure subsystem 202 may be used to compute the syndrome of some private data (i.e., by encoding the private data). In general, encoding the data is relatively simple compared to decoding the data since encoding the data just requires executing a plurality of XOR operations, which does not require the use of a generic processor that runs the ECC algorithm. The actual processing for correcting the private data using the syndrome, however, may need to be performed using a generic ECC processing module.

Figure 3:
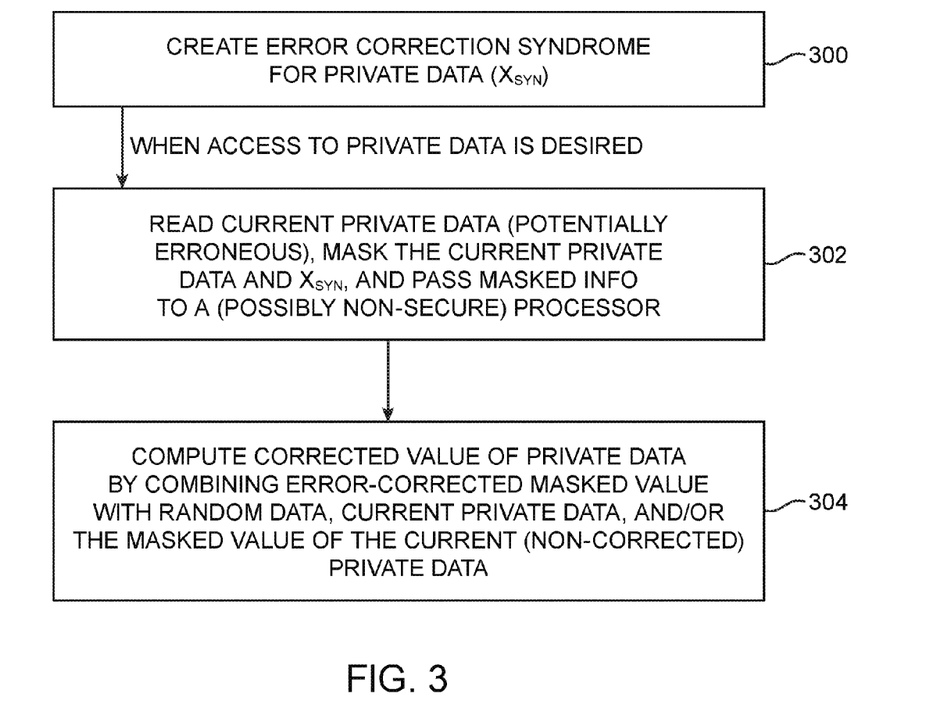
FIG. 3 is a flow chart of illustrative steps involved in operating the secure subsystem of FIG. 2 in accordance with an embodiment.
Figure 4:
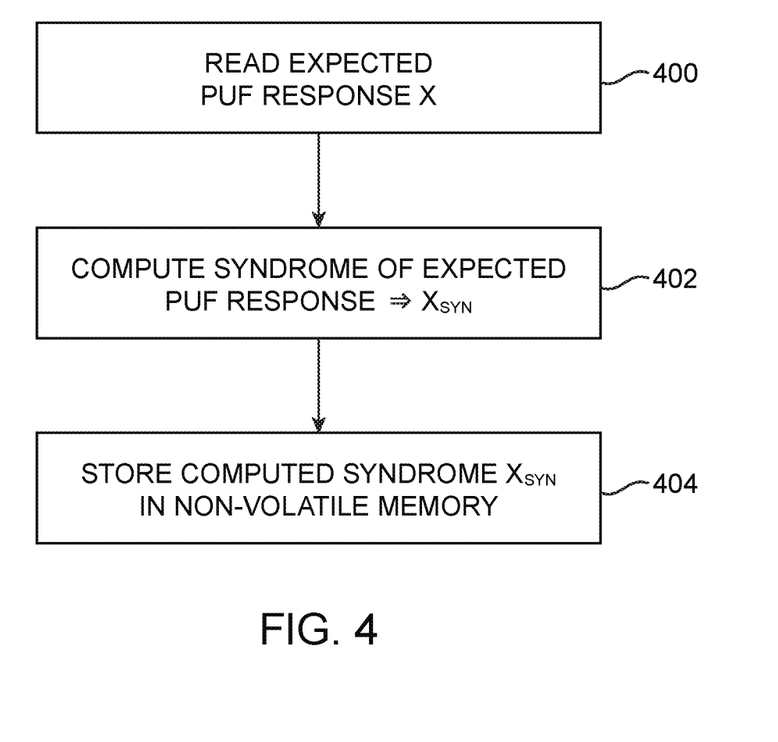
FIG. 4 is a flow chart of illustrative steps involved in creating a syndrome for private data in accordance with an embodiment.

FIG. 3 is a flow chart of illustrative steps involved in operating secure subsystem 202 of FIG. 2. At step 300, an initial PUF response X (referred to herein as "private data") may be read from the PUF circuit 206. The initial PUF response X may then be fed to syndrome generator 210 for generating the syndrome of X (i.e., $X_{SYN}$). This step may be performed during manufacturing of the device on which subsystem 202 is fabricated at the factory and is sometimes referred to as a "recruitment" operation. This recruitment procedure serves to generate a baseline syndrome for the initial PUF response that is assume to be correct and may be stored locally in non-volatile memory 212. These operations during step 300 are illustrated in detail in FIG. 4 (see, e.g., sub-steps 400, 402, 404).

After step 300 is complete, the device may be packaged and shipped to customers. During normal operation of the device, the user application may sometimes need access to the private PUF data and may send a corresponding notification to secure subsystem 202 via path 102 (see, e.g., FIG. 2). In such scenarios, secure subsystem 202 may respond by reading current private data from PUF circuit 206 and masking the current private data and the $X_{SYN}$ that is retrieved from non-volatile memory 212 (at step 302 of FIG. 3).

The current private data (i.e., the current output of PUF circuit 206) may be different from the initial PUF response X due to unpredictable changes or random noise on the integrated circuit. The current PUF response may therefore be potentially erroneous and is referred to herein as X' (e.g., X' may be mismatched from X). As described above, a masked version of X' and $X_{SYN}$ (i.e., the syndrome of the initial "correct" PUF response) may then be passed to potentially non-secure ECC processor 204 for error correction.

At step 304, secure subsystem 202 may receive information back from the ECC processor and may be configured to compute the desired PUF response X by combining an error-corrected masked value that is being returned from ECC processor 204 with random data (i.e., the random data used to mask X' during step 302), with the current private data X', and/or with the masked value of the current non-corrected private data (i.e., the masked version of X'). By passing only a masked version of X' to the ECC processor, bits in a subsequent PUF output X' can be corrected to obtain the target PUF response X using the ECC processor without having to actually reveal the raw value of X' to the potentially non-secure ECC processor.

Figure 5:
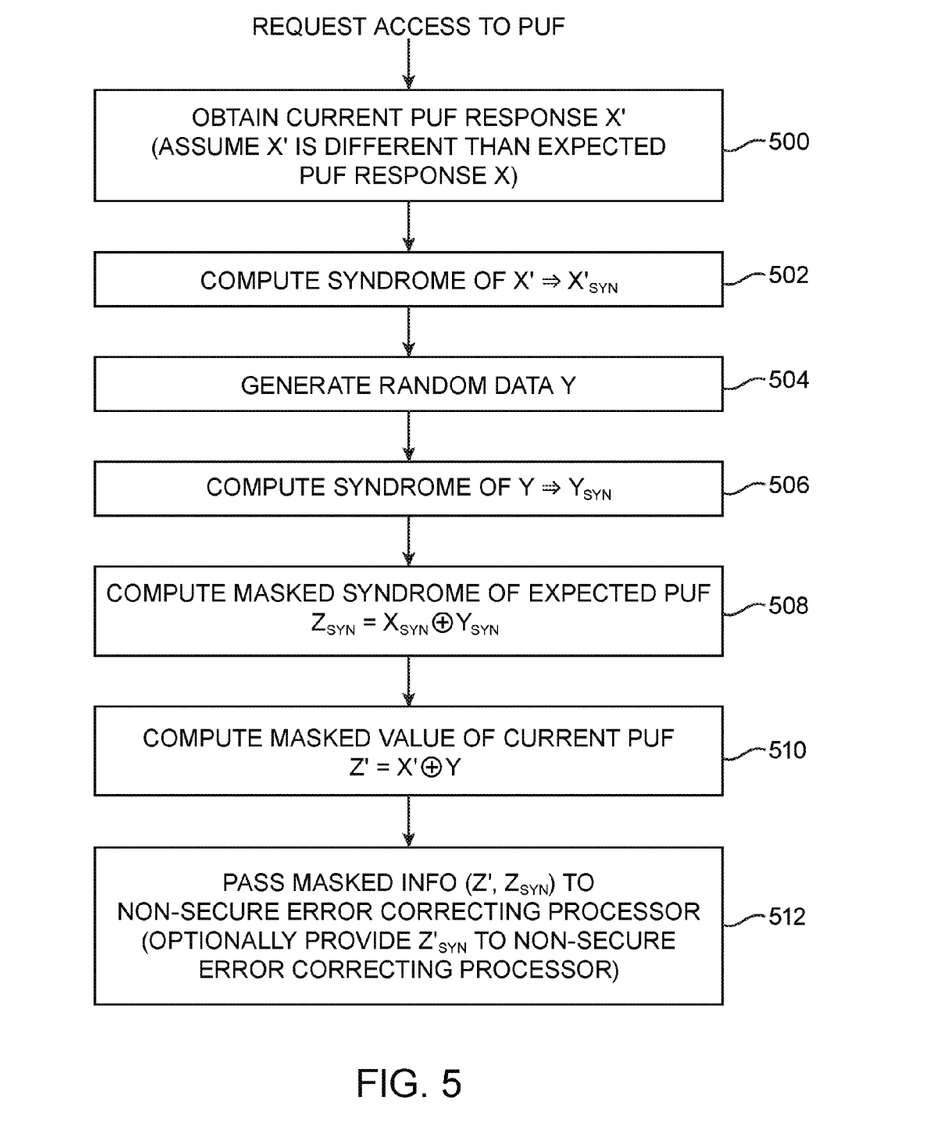
FIG. 5 is a flow chart of illustrative steps involved in reading potentially erroneous private data, masking the potentially erroneous private data, and passing the masked private data to a non-secure error correcting processor in accordance with an embodiment.

FIG. 5 is a flow chart of illustrative operations that may be performed during step 302 of FIG. 3. At step 500, secure subsystem 202 may be directed to obtain the current PUF response X' from PUF circuit 206. The current PUF response X' may be different than the target PUF response X read during recruitment due to changes in the random variation on the integrated circuit.

At step 502, syndrome generator 210 may be used to compute the syndrome of the current PUF response X' (referred to herein as $X'_{SYN}$). At step 504, random number generator 210 may be used to generate random private data Y. Random private data Y can be used to mask the private PUF responses. At step 506, syndrome generator 210 may be used to generate the syndrome of the random data to obtain a random data syndrome $Y_{SYN}$.

At step 508, control circuitry 214 on secure subsystem 202 may be used to compute a masked syndrome of the expected/desired PUF response ($Z_{SYN}$) based on the following equation:

$$Z_{SYN}=X_{SYN}\oplus Y_{SYN} \quad (1)$$

As shown in equation 1, $Z_{SYN}$ may be calculated by taking the XOR of the expected PUF response syndrome $X_{SYN}$ and the random private data syndrome $Y_{SYN}$.

At step 510, control circuitry 214 may be used to compute a masked value of the current PUF response (referred to herein as Z') based on the following equation:

$$Z'=X'\oplus Y \quad (2)$$

As shown in equation 2, masked private data Z' may be calculated by taking the XOR of the erroneous PUF response X' and random data Y.

At step 512, secure subsystem 202 may then pass the masked information (e.g., masked erroneous PUF response Z' and the masked syndrome of the desired PUF response $Z_{SYN}$) to the non-secure error-correcting processor 204 for performing error correction. At step 512, secure subsystem 202 may optionally compute the masked syndrome of the current PUF response by masking $X'_{SYN}$ obtained during step 502 with the syndrome of the random data (e.g., by taking the XOR of $X'_{SYN}$ and $Y_{SYN}$) and pass $Z'_{SYN}$ to error-correcting processor 204. As illustrated in this example, the raw PUF output responses are not revealed to the ECC processor, and as a result, the secret sensitive information remains protected from potential attackers.

In one suitable embodiment, when the non-secure error-correcting processor 204 receives the masked information from the secure subsystem 202, processor 204 may output a corrected masked value Z based on at least Z' and $Z_{SYN}$. If $Z'_{SYN}$ is received from secure subsystem 202, ECC processor 204 may use the difference between $Z_{SYN}$ and $Z'_{SYN}$ to correct any erroneous bits in Z' to obtain the corrected masked value Z. If, however, $Z'_{SYN}$ is not received from secure subsystem 202, ECC processor 204 may have to locally compute the syndrome of Z' before computing the corrected masked value Z. The corrected masked value Z may be retrieved from the ECC processor (see, e.g., step 600 in FIG. 6).

Figure 6:
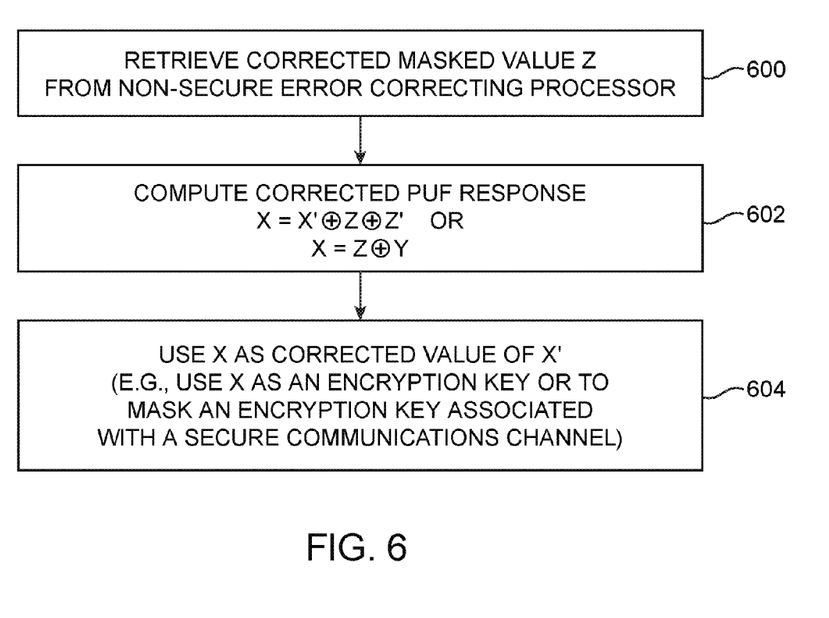
FIGS. 6 and 7 are flow charts of illustrative steps involved in computing corrected private data based on information received from the non-secure error correcting processor in accordance with an embodiment.

In response to receiving the corrected masked value Z, control circuitry 214 in the secure subsystem may be configured to compute a corrected PUF response X using at least one of the following equations:

$$X=X'\oplus Z\oplus Z' \quad (3)$$

$$X=Z\oplus Y \quad (4)$$

As shown in equation 3, the corrected PUF response X may be computed by taking the XOR of the current PUF response X' read locally at subsystem 202, corrected masked value Z retrieved from ECC processor 204, and erroneous masked value Z' computed locally at subsystem 202. As shown in equation 4, the corrected PUF response X may also be computed by taking the XOR of the corrected masked value Z and the random data Y. These equations work because Z is equal to (X⊕Y), whereas Z' is equal to (X'⊕Y).

At step 604, X may be used as the corrected value of X' (e.g., the newly computed X may now be used as an encryption key or to mask an encryption key associated with a secure communications channel).

In another suitable embodiment, when the non-secure error-correcting processor 204 receives the masked information from the secure subsystem 202, processor 204 may output a combined value that is equal to the XOR of Z and Z'. This combined value (e.g., Z⊕Z') may be retrieved from the ECC processor (see, e.g., step 700 in FIG. 7).

Figure 7:
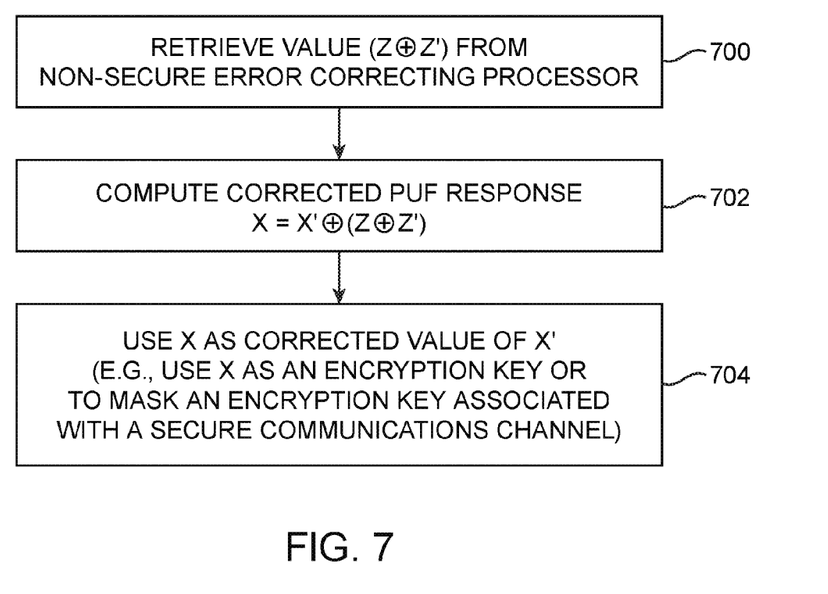

In response to receiving the combined value (Z⊕Z'), control circuitry 214 in the secure subsystem may be configured to compute a corrected PUF response X using the following equation:

$$X=X'\oplus(Z\oplus Z') \quad (5)$$

As shown in equation 5, the corrected PUF response X may be computed by taking the XOR of the current PUF response X' read locally at subsystem 202 and the combined value retrieved from the ECC processor. Equation 5 is similar to equation 3, except that the result of (Z⊕Z') has been precomputed at the non-secure ECC processor 204. This allows the secure subsystem 202 to only perform one XOR operation to obtain the corrected PUF response X. Assuming that Z is equal to (X⊕Y) and that Z' is equal to (X'⊕Y), the combined value of (Z⊕Z') therefore equals [(X⊕Y)⊕(X'⊕Y)], which simplifies to [X⊕X']. Equation 5 therefore reduces down to (X'⊕[X⊕X']), which indeed simplifies to just generating the corrected PUF response X.

At step 704, X may be used as the corrected value of X' (e.g., the newly computed X may now be used as an encryption key or to mask an encryption key associated with a secure communications channel).

In the aforementioned embodiments, the random value is used to mask the erroneous PUF response X' so as to protect the system from potential attackers. In certain embodiments, the raw PUF response X' need not be sent to the non-secure ECC processor. In such scenarios, the use of the random value that is used for masking the raw PUF output may be eliminated.

Figure 8:
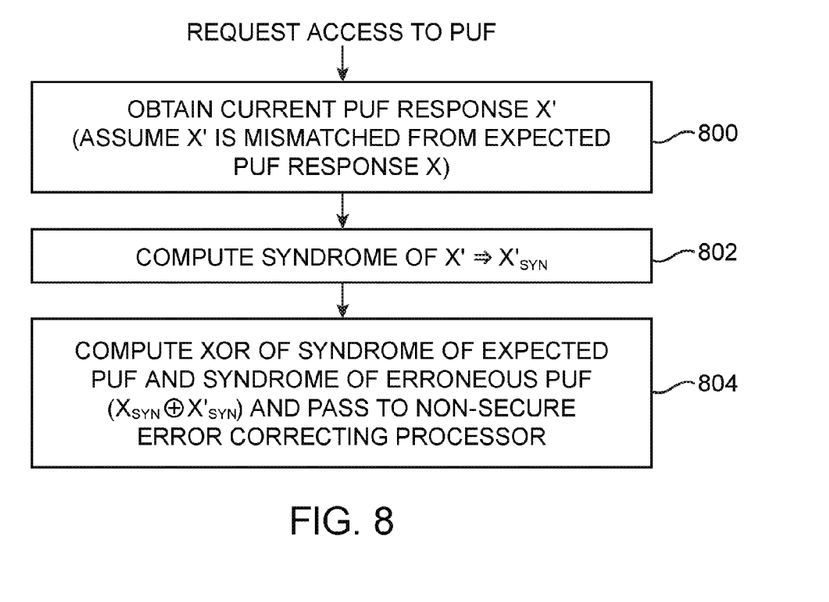
FIG. 8 is a flow chart of illustrative steps involved in reading potentially erroneous private data, computing an intermediate result based only on syndrome data, and passing the intermediate result to a non-secure error correcting processor in accordance with an embodiment.

FIG. 8 is a flow chart of illustrative operations that may be performed in response to a request to access the PUF response which obviates the use of the random data. At step 800, secure subsystem 202 may be directed to obtain the current PUF response X' from PUF circuit 206. The current PUF response X' may be different than the target PUF response X read during recruitment due to changes in the random variation on the integrated circuit.

At step 802, syndrome generator 210 may be used to compute the syndrome of the current PUF response X' (referred to herein as X'$_{SYN}$). At step 804, control circuitry 214 on secure subsystem 202 may be used to combine the computed syndrome with the stored syndrome (e.g., by taking the XOR of X'$_{SYN}$ and X$_{SYN}$). Secure subsystem 202 may then pass the XORed result to the non-secure error-correcting processor 204 for performing error correction. Because only the XORed result is passed to the non-secure error-correcting processor and because X' is never actually exposed outside of secure subsystem 202, any secret sensitive information remains protected from potential attackers.

When the non-secure error-correcting processor 204 receives the XORed result from the secure subsystem 202, processor 204 may output a corresponding correction vector W. The correction vector may be retrieved from the ECC processor (see, e.g., step 900 in FIG. 9).

Figure 9:
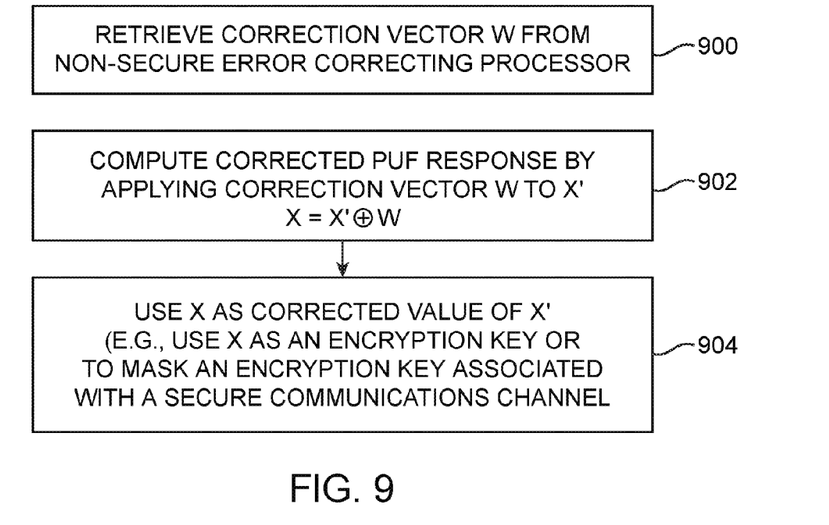
FIG. 9 is a flow chart of illustrative steps involved in computing corrected private data based on a correction vector retrieved from the non-secure correcting processor in accordance with an embodiment.

In response to receiving the correction vector W, control circuitry 214 in the secure subsystem may be configured to compute a corrected PUF response X by applying the correction vector W to the erroneous PUF response X' according to the following equation:

$$X = X' \oplus W \qquad (6)$$

As shown in equation 6, the corrected PUF response X may be computed by taking the XOR of the current PUF response X' read locally at subsystem 202 and the correction vector W obtained from the non-secure ECC processor. At step 904, X may be used as the corrected value of X' (e.g., the newly computed X may now be used as an encryption key or to mask an encryption key associated with a secure communications channel).

The steps of FIGS. 5-9 are merely illustrative and existing steps may be modified or omitted, additional steps may be added, and the order of certain steps may be altered without departing from the scope of the present invention.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method for operating a system that comprises an error-correction code processor and a secure subsystem that includes a Physically Unclonable Function (PUF) circuit and a random number generator, comprising:
   using the PUF circuit to generate a PUF response;
   using the random number generator to generate a random number;
   masking the PUF response with the random number;
   masking a syndrome of a correct PUF response with a syndrome of the random number to generate a masked syndrome of the correct PUF response; and
   with the error-correction code processor, generating a corrected masked PUF response based on at least the masked PUF response and the masked syndrome of the correct PUF response.

2. The method defined in claim 1, further comprising:
   storing a syndrome of the correct PUF response in non-volatile memory, where the PUF response and the correct PUF response are mismatched.

3. The method defined in claim 1, further comprising:
   using a syndrome generator to generate a syndrome of the PUF response; and
   masking the syndrome of the PUF response with the syndrome of the random number.

4. The method defined in claim 1, wherein the error correction processor comprises a processor that implements a linear error-correcting code (ECC).

5. The method defined in claim 1, further comprising:
   with the secure subsystem, receiving the corrected masked PUF response from the error correction processor.

6. The method defined in claim 5, further comprising:
   using control circuitry in the secure subsystem to compute a corrected PUF response that matches the correct PUF response based on the corrected masked PUF response received from the error correction processor, the PUF response, and the masked PUF response.

7. The method defined in claim 5, further comprising:
using control circuitry to compute a corrected PUF response that matches the correct PUF response based on the corrected masked PUF response received from the error correction processor and the random data.

8. A secure subsystem, comprising:
a Physically Unclonable Function (PUF) circuit that generates a PUF response;
a random number generator that generates a random number;
an output on which a masked PUF response is provided, wherein the masked PUF response is obtained by masking the PUF response with the random number; and
an input on which a masked corrected PUF response is received, wherein the masked corrected PUF response is obtained by masking the masked PUF response with a masked syndrome of an initial PUF response, wherein the initial PUF response is a correct response of the PUF circuit when provided with the given input, and wherein the masked syndrome of the initial PUF response is obtained by masking a syndrome of the initial PUF response with a syndrome of the random number.

9. The secure subsystem defined in claim 8, further comprising:
circuitry for outputting the masked PUF response by computing an exclusive OR (XOR) operation on the PUF response and the random number.

10. The secure subsystem defined in claim 8, further comprising:
non-volatile memory for storing a syndrome of the initial PUF response, wherein the PUF response is different than the initial PUF response.

11. The secure subsystem defined in claim 10, further comprising:
control circuitry for obtaining a corrected PUF response based on the received masked corrected PUF response, wherein the corrected PUF response is identical to the initial PUF response.

12. A method for operating a secure subsystem that includes a Physically Unclonable Function (PUF) circuit and a syndrome generator, comprising:
using the PUF circuit to generate a PUF response;
using the syndrome generator to compute a syndrome of the PUF response;
storing a syndrome of a desired PUF response in non-volatile memory, where the PUF response is an erroneous PUF response and the desired PUF response is an initial, correct response of the PUF circuit;
masking the PUF response to generate a masked PUF response;
masking the syndrome of the desired PUF response with a syndrome of a random number to generate a masked syndrome of the desired PUF response;
providing the masked PUF response and the masked syndrome of the desired PUF response to a non-secure error-correcting code processor; and
receiving a masked corrected PUF response from the non-secure error-correcting code processor.

13. The method defined in claim 12, further comprising:
using control circuitry in the secure subsystem to compute a corrected PUF response that matches the desired PUF response based on the masked corrected PUF response.

* * * * *